(12) United States Patent
Gross et al.

(10) Patent No.: US 8,934,112 B1
(45) Date of Patent: Jan. 13, 2015

(54) METHODS AND SYSTEMS FOR ALLOCATING RESOURCES IN A PRINT PRODUCTION ENVIRONMENT

(71) Applicant: Xerox Corporation, Norwalk, CT (US)

(72) Inventors: Eric Michael Gross, Rochester, NY (US); Jack Gaynor Elliot, Penfield, NY (US); Sudhendu Rai, Fairport, NY (US); Ranjit Kumar Ettam, Pradesh (IN); Anand Singh, Karnataka (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/044,359

(22) Filed: Oct. 2, 2013

(51) Int. Cl.
*G06F 3/12* (2006.01)
*G06K 15/02* (2006.01)

(52) U.S. Cl.
CPC .......... *G06K 15/025* (2013.01); *G06K 15/1809* (2013.01); *G06F 3/1203* (2013.01); *G06F 3/1229* (2013.01); *G06F 3/126* (2013.01)
USPC ........................... 358/1.13; 358/1.15; 358/1.1

(58) Field of Classification Search
None
See application file for complete search history.

(56) References Cited

U.S. PATENT DOCUMENTS

| 8,107,106 | B2 * | 1/2012 | Rai ............................... 358/1.15 |
| 2007/0236724 | A1 * | 10/2007 | Rai et al. ..................... 358/1.15 |
| 2009/0025003 | A1 * | 1/2009 | Rai ................................. 718/102 |
| 2013/0128302 | A1 * | 5/2013 | Rai et al. ..................... 358/1.15 |

OTHER PUBLICATIONS

Wolpert et al., "No Free Lunch Theorems for Optimization", IEEE Transactions on Evolutionary Computation, vol. 1, No. 1, Apr. 1997, pp. 67-82.

* cited by examiner

*Primary Examiner* — Marcus T Riley
(74) *Attorney, Agent, or Firm* — Fox Rothschild LLP

(57) ABSTRACT

A method of determining a cell configuration in a print production environment may include identifying a set of print devices to assign to a cell, identifying a print device number, identifying one or more subsets of print devices from the set, where each subset includes a unique portion of the print devices in the set, and each subset includes a number of print devices equal to the print device number, performing a simulation of operation on each subset to determiner a subset performance metric for each subset, selecting one of the subsets based on the associated subset performance metric, decrementing the print device number by an amount, updating the set with the selected subset, and repeating the identifying one or more subsets, performing the simulation, selecting one of the subsets, decrementing the print device number and updating until no subset performance metric satisfies a performance constraint.

18 Claims, 6 Drawing Sheets

METHODS AND SYSTEMS FOR ALLOCATING RESOURCES IN A PRINT PRODUCTION ENVIRONMENT

BACKGROUND

Assigning resources to a print production environment can be a complex and time consuming process. For N number of devices, there are 2^N possibilities, assuming N is known, which is not typically the case. Furthermore, each possibility requires a time consuming full discrete event simulation since there is no analytic model capable of expressing production process characteristics of interest, except in the simplest of cases. This disclosure describes methods and systems that are directed to improving such processes.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of determining a cell configuration in a print production environment may include identifying a set comprising a plurality of print production devices. Each print production device may be available to be used in a cell of a print production environment. The method may include running a first simulation using the plurality of print production devices to determine a first primary performance metric value associated with assigning the plurality of print production devices to the cell, and a first secondary performance metric value associated with assigning the plurality of print production devices to the cell. The method may include determining whether the first primary performance metric value satisfies a first constraint and the first secondary performance metric value satisfies a second constraint, and in response to determining that the first primary performance metric value and the first secondary performance metric value satisfy the one or more constraints, identifying one or more subsets, where each subset includes a unique portion of the plurality of print production devices, and each portion includes a number of print production devices that is less than a number of print production devices in the plurality of print production devices, for each subset, running a second simulation using the print devices associated with the subset to determine a second primary performance metric value associated with assigning the print devices associated with the subset to the cell, and a second secondary performance metric value associated with assigning the print devices associated with the subset to the cell, selecting one of the subsets based on one or more of the associated second primary performance metric value and the second secondary performance metric value, determining one or more removed print production devices, where each removed production device is included in the set but not the selected subset, and removing the removed print production devices from the set to create a modified set.

In an embodiment, a method of determining a cell configuration in a print production environment may include identifying a set of print devices to assign to a cell, identifying a print device number, identifying one or more subsets of print devices from the set, where each subset includes a unique portion of the print devices in the set, and each subset includes a number of print devices equal to the print device number, performing a simulation of operation on each subset to determiner a subset performance metric for each subset, selecting one of the subsets based on the associated subset performance metric, decrementing the print device number by an amount, updating the set with the selected subset, and repeating the identifying one or more subsets, performing the simulation, selecting one of the subsets, decrementing the print device number and updating until no subset performance metric satisfies a performance constraint.

In an embodiment, a system of determining a cell configuration in a print production environment may include a computing device, and a computer-readable storage medium in communication with the computing device. The computer-readable storage medium may include one or more programming instructions that, when executed, cause the computing device to identify a set comprising a plurality of print production devices, where each print production device is available to be used in a cell of a print production environment, run a first simulation using the plurality of print production devices to determine a first primary performance metric value associated with assigning the plurality of print production devices to the cell, and a first secondary performance metric value associated with assigning the plurality of print production devices to the cell, determine whether the first primary performance metric value satisfies a first constraint and the first secondary performance metric value satisfies a second constraint, and in response to determining that the first primary performance metric value and the first secondary performance metric value satisfy the one or more constraints, identify one or more subsets, where each subset includes a unique portion of the plurality of print production devices, and each portion includes a number of print production devices that is less than a number of print production devices in the plurality of print production devices. The computer-readable storage medium may include one or more programming instructions that, when executed, cause the computing device to, for each subset, run a second simulation using the print devices associated with the subset to determine a second primary performance metric value associated with assigning the print devices associated with the subset to the cell, and a second secondary performance metric value associated with assigning the print devices associated with the subset to the cell, select one of the subsets based on one or more of the associated second primary performance metric value and the second secondary performance metric value, determine one or more removed print production devices, wherein each removed production device is included in the set but not the selected subset, and remove the removed print production devices from the set to create a modified set.

In an embodiment, a system of determining a cell configuration in a print production environment may include a computing device and a computer-readable storage medium in communication with the computing device. The computer-readable storage medium may include one or more programming instructions that, when executed, cause the computing device to identify a set of print devices to assign to a cell, identify a print device number, identify one or more subsets of print devices from the set, where each subset includes a unique portion of the print devices in the set, and each subset includes a number of print devices equal to the print device number, perform a simulation of operation on each subset to determiner a subset performance metric for each subset, select one of the subsets based on the associated subset performance metric, decrement the print device number by an amount, update the set with the selected subset, and repeating the identify one or more subsets, perform the simulation, select one of the subsets, decrement the print device number and update until no subset performance metric satisfies a performance constraint.

DETAILED DESCRIPTION

Figure 1:
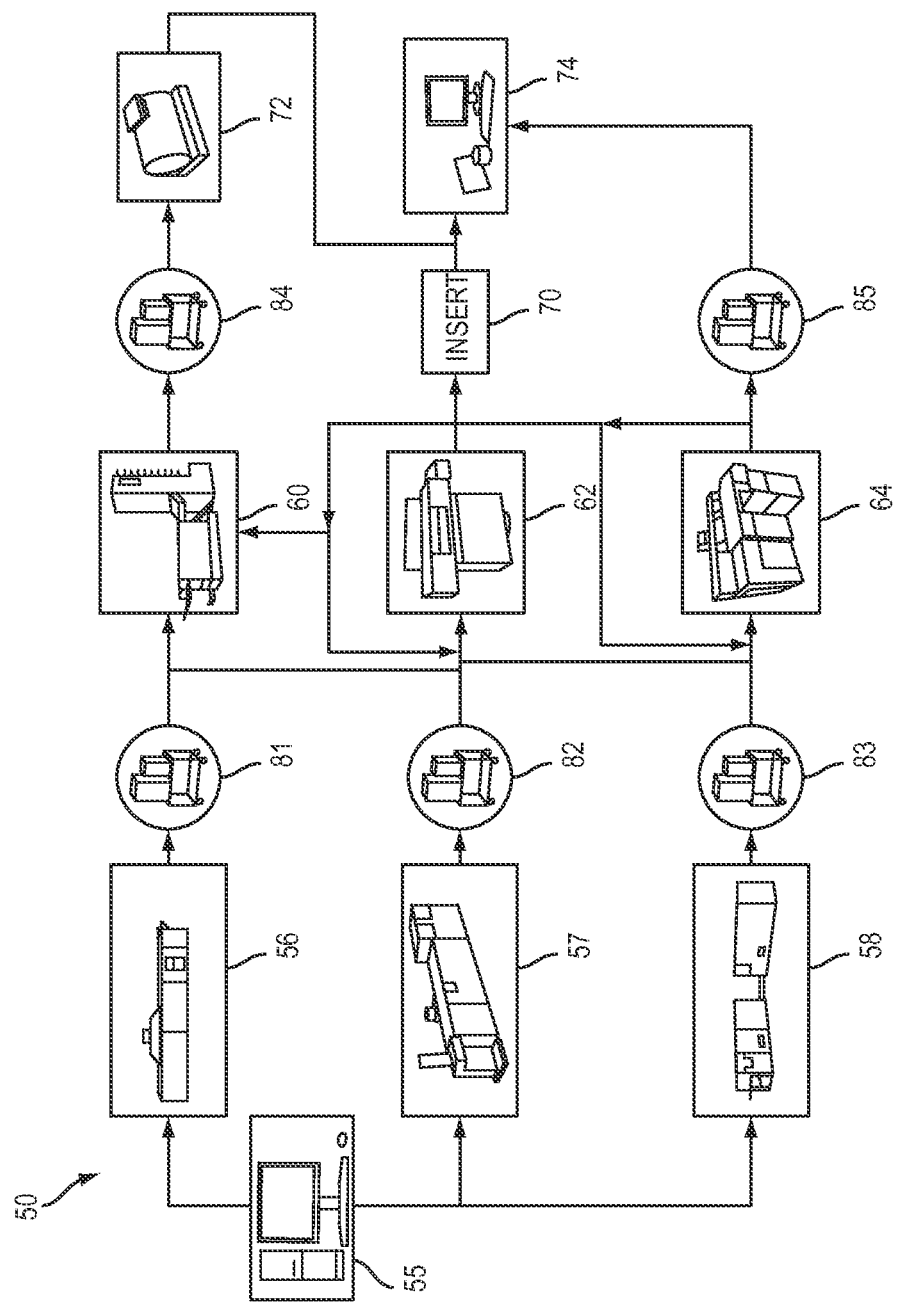
FIG. 1 illustrates an example of a production environment according to an embodiment.

The following terms shall have, for purposes of this application, the respective meanings set forth below:

A "cell" refers to one or more production devices in a production environment that are capable of processing at least a portion of a job. For example, in a print shop, a cell may include one or more print production devices that are capable of processing at least a portion of a print job.

A "cell configuration" refers to the production devices that are selected or assigned to a cell.

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

A "job" refers to a logical unit of work that is to be completed for a customer. For example, in a print production environment, a job may include one or more print jobs from one or more clients. For example, a job in a vehicle production environment may include manufacturing a vehicle or a portion thereof. As another example, a job in a chemical production environment may include producing or processing a chemical product or a portion thereof. Similarly, a job in a computing device production environment may be to manufacture a computing device or a portion thereof such as, for example, a printer, a scanner or a copier.

A "performance metric" refers to a performance measure associated with a production environment.

A "print job" refers to a job processed in a print shop. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "production device" device refers to a device used to process at least a portion of a job. Examples of production devices in a print shop may include, without limitation, printers, inserters, binders, punchers, collators, multi-function devices or other similar equipment and/or the like.

A "production environment" refers to machine and/or human labor used to complete one or more jobs. A production environment may include one or more devices or other equipment that may be used to complete one or more jobs. Example production environments may include, without limitation, a print production environment, a chemical production environment, a vehicle production environment, a computing device manufacturing production environment, and/or other manufacturing production environments.

A production environment may include one or more autonomous production cells that each may include one or more production devices. In an embodiment, a cell may include one or more devices that are capable of delivering at least one type of job. For example, in a print shop, a cell may include production devices such as, for example, multiple printers, a shrink-wrapper and a computerized control system. A different cell may include printers, cutters and copiers. In an embodiment, print jobs may be intelligently routed to cells to provide desired load balancing and/or throughput. The use of cells may help decrease the amount of work in progress and labor and inventory costs associated with processing jobs, and may increase the utilization of the production devices in a production environment.

FIG. 1 shows an example of a production environment 50, in this case, example elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

In an embodiment, a cell configuration may be determined that satisfies one or more performance metrics. Example performance metrics may include, without limitation, a performance cost, turnaround time, and/or the like. In an embodiment, an algorithm may be used to identify a configuration that satisfies one or more performance metrics in a cellular production environment. The algorithm may be a greedy-type algorithm. A greedy-type algorithm is an algorithm that follows a solution technique that makes optimal decisions at each stage of a process with the goal of finding an optimal global solution.

In an embodiment, a cell configuration may be determined using a discrete event simulation. The simulation may be simulated with a known set of jobs over a certain time period. The approach may be applied in a top-down fashion, meaning that it begins with a sufficient or excess number of production devices in a cell to satisfy the performance metrics, and gradually reduces the number of production devices in the cell while still satisfying the performance metrics. In an alternate embodiment, the approach may be applied in a bottom-up fashion, meaning that it begins with an insufficient number of production devices in a cell to satisfy the performance metrics, and gradually increases the number of production devices in the cell until the performance metrics are satisfied.

Figure 2:
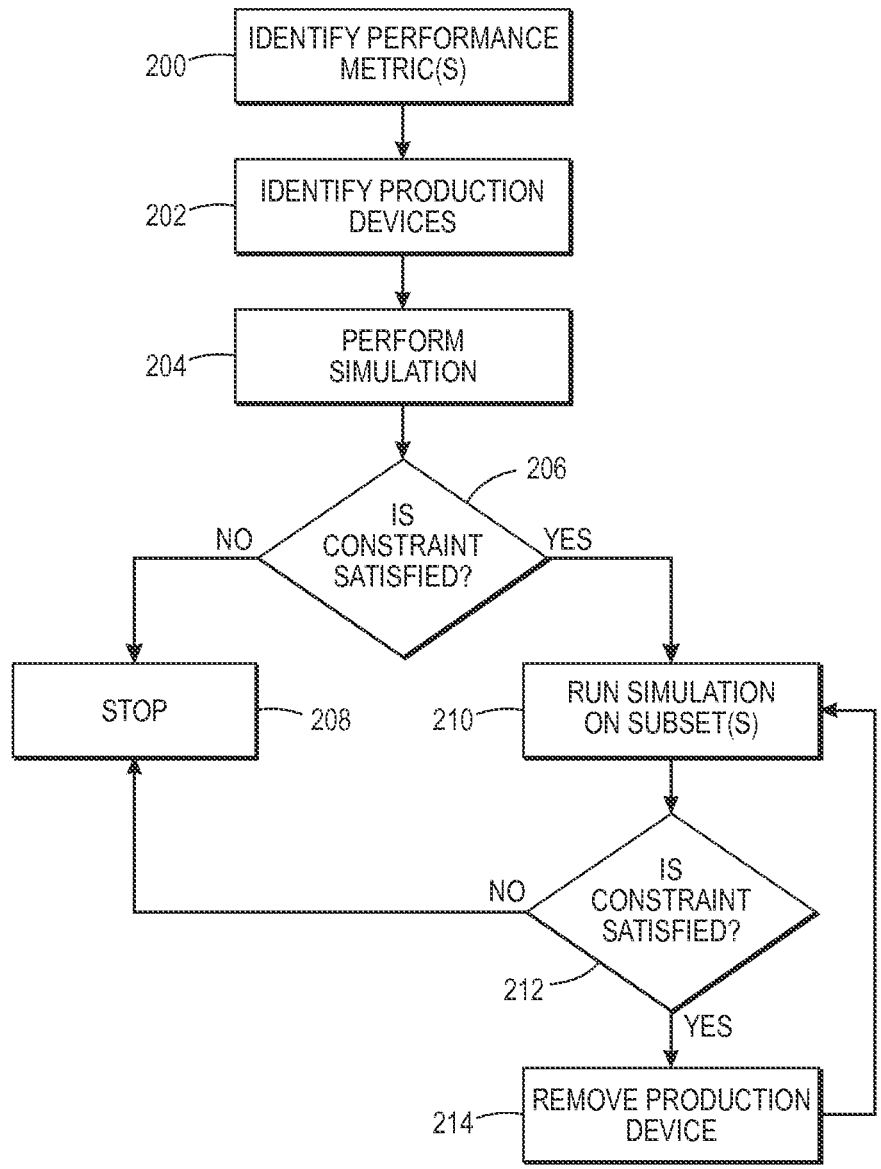
FIG. 2 illustrates a flow chart of an example method of determining a cell configuration according to an embodiment.

FIG. 2 illustrates a flow chart of an example method of determining a cell configuration according to an embodiment. As illustrated by FIG. 2, one or more performance metrics may be identified 200. In an embodiment, the method may involve the use of two performance metrics. One may be considered a primary performance metric, and it may be a performance metric that is to be minimized or maximized by a configuration. The other may be considered a secondary performance metric that is to have a value relative to a threshold value. For example, a secondary performance metric may have a value that falls below a threshold value, a value that exceeds a threshold value, a value that equals a threshold value and/or the like.

For purposes of FIG. 2, the performance metrics may be cost and job turnaround time. As such, a best performance may be a configuration having the least cost with a job turnaround time that does not exceed a threshold value. Additional and/or alternate performance metrics may be used within the scope of this disclosure.

In an embodiment, one or more available production devices may be identified 202. An available production device may be a production device that may be selected for inclusion in a cell. In an embodiment, a simulation may be performed 204 with all of the identified production devices assigned to the cell. For example, if ten production devices, M, are identified, then a simulation with a configuration of $\{M_1, M_2, \ldots, M_{10}\}$ may be performed 204. In an embodiment, the simulation may yield one or more output values. In an embodiment, each output value may be associated with a performance metric. For instance, in this example, the simulation may produce output values for a turnaround time and a cost associated with the configuration.

In an embodiment, an output value corresponding to a secondary performance metric may be compared 206 to the corresponding threshold value to determine whether the associated constraint is satisfied. If the constraint is not satisfied, then the method may stop 208. For instance, referring to the above example, a simulation with a configuration of $\{M_1, M_2, \ldots, M_{10}\}$ may yield an output value associated with the secondary performance metric turnaround time. The turnaround time may be associated with an upper threshold value that specifies the maximum acceptable turnaround time. If the turnaround time output value exceeds the threshold value, the simulation may stop 208 because there is no solution that satisfies the given constraints. In this situation, the simulation may be restarted with a different number of production devices. For instance, referring back to the above example, the simulation may be restarted with eleven production devices $\{M_1, M_2, \ldots, M_{11}\}$.

In an embodiment, if the associated constraint is satisfied, one or more simulations may be run 210 using a subset of the production devices. In an embodiment, if an original set of production devices includes N number of devices, then N simulations may be run 210 using one or more combinations of N−1 production devices. For instance, in the above example, the original set of production devices includes ten production devices. As such, ten more simulations may be run 210 on one or more subsets of machines that each includes nine production devices. The first simulation may remove $M_1$ and retain $\{M_2, \ldots, M_{10}\}$. The second simulation may remove $M_2$ and retain $\{M_1, M_3, M_4, \ldots, M_{10}\}$, the third simulation may remove $M_3$ and retain $\{M_1, M_2, M_4, \ldots, M_{10}\}$ and so on.

In an embodiment, each simulation may yield output values for the primary and secondary performance constraints. Table 1 illustrates example output values for the simulations of the above example according to an embodiment.

TABLE 1

| Ref. | Production Device Subset | Cost Performance Metric | Turnaround Time Performance Metric |
|---|---|---|---|
| A | $\{M_1, \ldots, M_{10}\}$ | 100,000 | 60 |
| B | $\{M_2, \ldots, M_{10}\}$ | 59,000 | 170 |
| C | $\{M_1, M_3, M_4, \ldots, M_{10}\}$ | 90,000 | 90 |
| D | $\{M_1, M_2, M_4, M_5, \ldots, M_{10}\}$ | 63,000 | 63 |
| E | $\{M_1, M_2, M_3, M_5, \ldots, M_{10}\}$ | 215,000 | 86 |
| F | $\{M_1, M_2, M_3, M_4, M_6, M_7, M_8, M_9, M_{10}\}$ | 125,000 | 74 |
| G | $\{M_1, M_2, M_3, M_4, M_5, M_7, M_8, M_9, M_{10}\}$ | 180,000 | 78 |
| H | $\{M_1, M_2, M_3, M_4, M_5, M_6, M_8, M_9, M_{10}\}$ | 245,000 | 74 |
| I | $\{M_1, M_2, M_3, M_4, M_5, M_6, M_7, M_9, M_{10}\}$ | 118,000 | 87 |
| J | $\{M_1, M_2, M_3, M_4, M_5, M_6, M_7, M_8, M_{10}\}$ | 180,000 | 71 |
| K | $\{M_1, \ldots, M_9\}$ | 53,000 | 130,000 |

Figure 3:
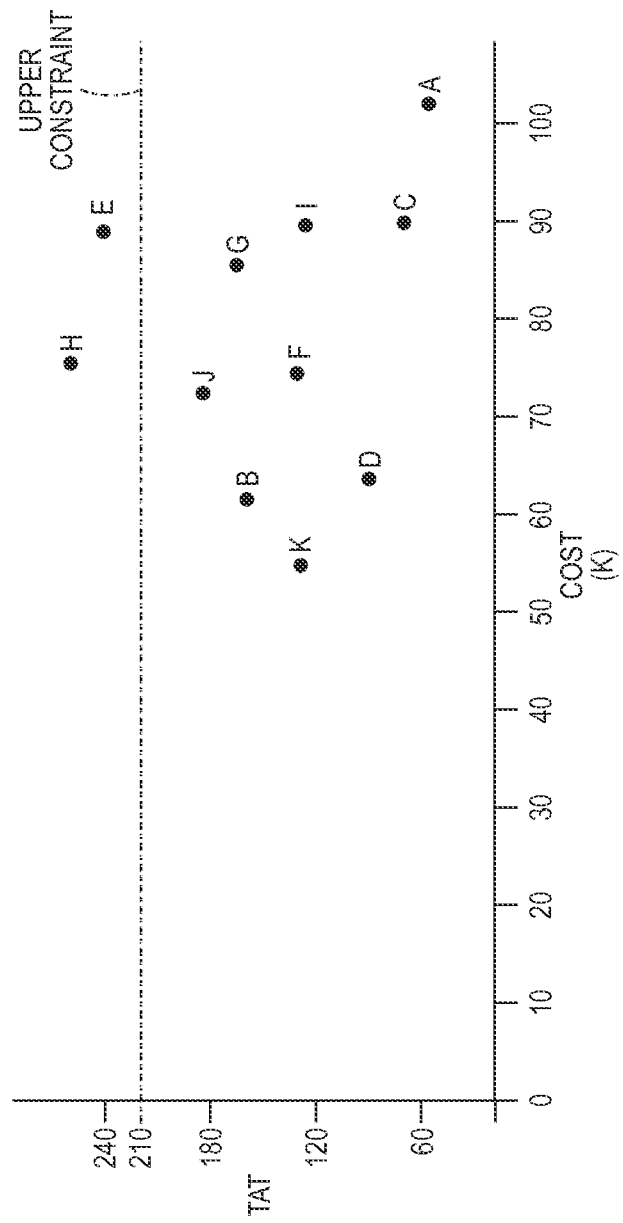
FIGS. 3 and 4 illustrate example graphs of cost and turnaround time according to various embodiments.

FIG. 3 illustrates an example graph showing a plot of the cost performance metric and turnaround time performance metric from Table 1 according to an embodiment.

Referring back to FIG. 2, the system may analyze the performance metric or metrics for each of the subsets to determine 212 whether at least one of the subsets satisfies one or more constraints. For example, the system may analyze one or more performance metrics of one or more subsets to determine whether they satisfy a constraint on turnaround time, cost and/or the like. If no subset is associated with performance metrics that satisfy the appropriate constraints, the process may stop 208.

In an embodiment, if at least one subset is associated with one or more performance metrics that satisfy the appropriate constraints, then one or more production devices may be removed 214 from a cell based on the simulations. The production device or devices that are removed 214 may be determined based on the values of the associated performance criteria. In an embodiment, a production device having a performance criterion value that violates one or more constraints may not be removed. For example, as illustrated by FIG. 3, a constraint restricting the turnaround time to no more than 210 minutes exists. The production device subsets represented by letters 'E' and 'H' violate this constraint. As such, production devices M4, which is not included subset E and M7, which is not included in subset 'H', may not be removed from set.

In an embodiment, if all of the subsets have a performance criteria value that violates one or more constraints, the process may be stopped because no further reduction in production devices is permissible.

In an embodiment, a production device that results in the largest reduction of a primary performance criteria without violating a constraint associated with the secondary performance criteria may be removed 214. For example, referring to FIG. 3, Production Device Subset K is associated with the largest cost reduction that does not violate the turnaround time threshold constraint. As such, $M_{10}$ may be removed 214.

In an embodiment, the production device that results in the smallest decrease in a secondary performance metric may be removed 214. For example, referring to FIG. 3, Production Device Subset C is associated with the smallest decrease in turnaround time, so $M_2$ may be removed 214.

In an embodiment, the production device that results in the greatest reduction of the primary performance criteria per unit increase or decrease of the secondary performance criteria may be removed 214. For example, referring to FIG. 3, Production Device Subset D is associated with the greatest cost reduction per unit turnaround time adjustment, so $M_3$ may be removed 214. Additional and/or alternate rules for determining what production device or devices to remove may be used within the scope of this embodiment.

In certain embodiments, more than one production device may be removed from a subset at a certain time. The production devices that are removed may be determined in a manner similar to that described above or in a combination of manners as described above. For example, if two production devices are removed from a subset, they may be the production devices that results in the largest and second largest reduction of a primary performance criteria without violating a constraint associated with the secondary performance criteria. Alternatively, one production device may be a device that results in the largest and second largest reduction of a primary performance criteria without violating a constraint associated with the secondary performance criteria, while the other may be the device that results in the smallest increase in a secondary performance metric. Additional and/or alternate combinations may be used within the scope of this disclosure.

As an example, one or more simulations may be run 210 using one or more subsets of the production devices in the modified cell. For instance, referring to the above example, assume that production device $M_2$ is removed from the production device set, thus creating the modified cell that includes $\{M_1, M_3, M_4, \ldots, M_{10}\}$. One or more simulations may be run 210 using one or more subsets of the modified cell. In an embodiment, each simulation may yield output values for the primary and secondary performance constraints. Table 2 illustrates example output values for the simulations of the above example according to an embodiment.

TABLE 2

| Ref. | Production Device Subset | Cost Performance Metric | Turnaround Time Performance Metric |
|---|---|---|---|
| C | $\{M_1, M_3, M_4, \ldots, M_{10}\}$ | 90,000 | 90 |
| L | $\{M_1, M_4, \ldots, M_{10}\}$ | 76,000 | 160 |
| M | $\{M_1, M_3, M_5, \ldots, M_{10}\}$ | 71,000 | 100 |
| N | $\{M_1, M_3, M_4, M_6, \ldots, M_{10}\}$ | 75,000 | 260 |
| O | $\{M_1, M_3, M_4, M_5, M_7, \ldots, M_{10}\}$ | 83,000 | 120 |
| P | $\{M_1, M_3, M_4, M_5, M_6, M_8, \ldots, M_{10}\}$ | 74,000 | 200 |
| Q | $\{M_1, M_3, M_4, M_5, M_6, M_7, M_9, M_{10}\}$ | 95,000 | 180 |
| R | $\{M_1, M_3, M_4, M_5, M_6, M_7, M_8, M_{10}\}$ | 94,000 | 140 |
| S | $\{M_1, M_3, M_4, M_5, M_6, M_7, M_8, M_9\}$ | 64,000 | 130 |

Figure 4:
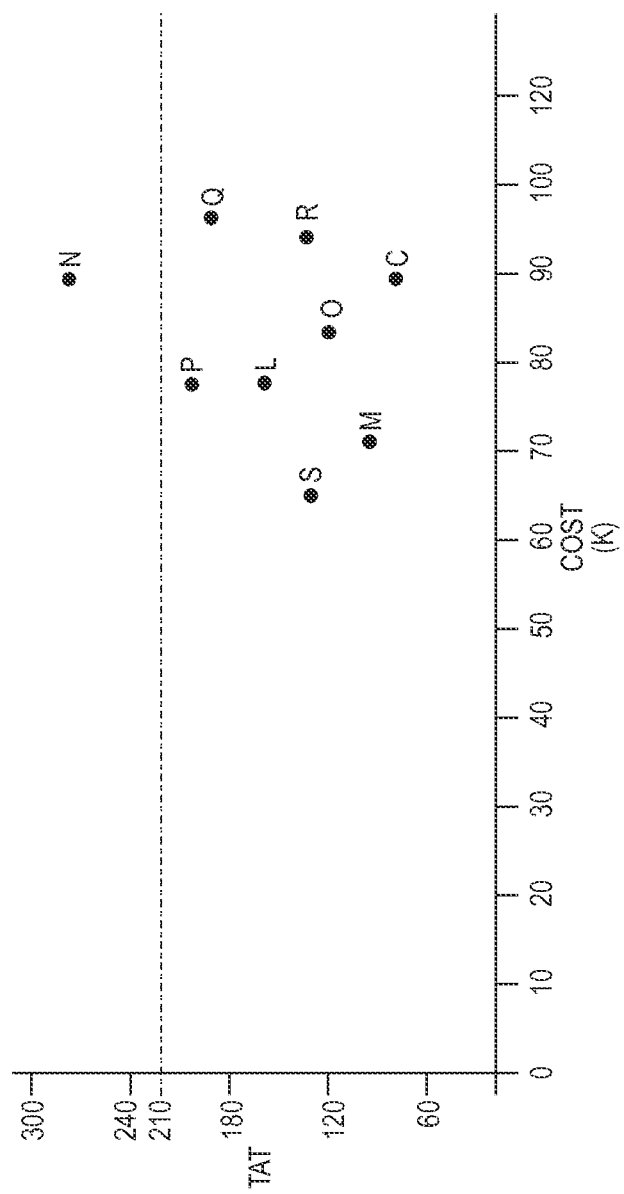

FIG. 4 illustrates an example graph showing a plot of the cost performance metric and turnaround time performance metric from Table 2 according to an embodiment.

Referring back to FIG. 2, in an embodiment, one or more production devices may be removed 214 from a modified cell based on the simulations. In an embodiment, one or more production devices may be removed 214 from a modified cell in a manner similar to that described above for removing one or more production devices from a cell.

Figure 5:
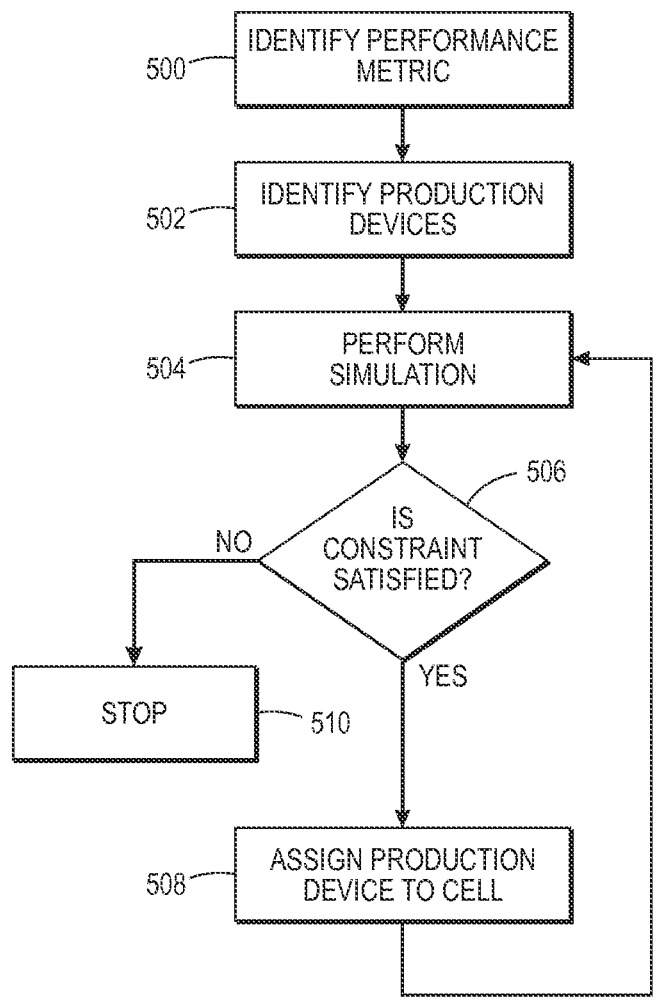
FIG. 5 illustrates a flow chart of an example method of determining a cell configuration according to an embodiment.

In certain embodiments, a cell configuration may be determining using a bottom-up approach. FIG. 5 illustrates an example flow chart of a bottom-up approach according to an embodiment. As illustrated by FIG. 5, one or more performance metrics may be identified 500. The performance metrics may be considered a primary performance metric and a secondary performance metric. For purposes of FIG. 5, the performance metrics may be cost and job turnaround time. As such, a best performance may be a configuration having the least cost with a job turnaround time that does not exceed a threshold value. Additional and/or alternate performance metrics may be used within the scope of this disclosure.

In an embodiment, one or more available production devices may be identified 502. An available production device may be a production device that may be selected for inclusion in a cell. In an embodiment, a simulation may be performed 504 with one of the identified production devices assigned to the cell. In an embodiment, the simulation may yield one or more output values. In an embodiment, each output value may be associated with a performance metric. For instance, in this example, the simulation may produce output values for a turnaround time and a cost associated with the configuration.

In an embodiment, an output value corresponding to a secondary performance metric may be compared 506 to the corresponding threshold value to determine whether the associated constraint is satisfied. If the constraint is not satisfied, then the one or more of the identified production devices may be assigned 508 to the cell. If the constraint is satisfied, the process may stop 510.

In an embodiment, a determination of which production device or devices to added to the cell may be based on one or more simulated device utilization levels. For example, if a production device is utilized a high percentage of time, then it is likely that adding an additional such production device would be beneficial. In an embodiment, a production device that results in the greatest benefit to cost tradeoff may be added to a cell.

One or more simulations may be run 504 on the new set of the production devices. Production devices may be added to the cell configuration, and simulations may be run on the new configurations until a configuration is identified that satisfies all associated constraints.

The following example illustrates the described approach of determining a cell configuration (referred to as a greedy approach) compared with a brute force approach according to an embodiment. This example assumes two cells and six production devices as illustrated in Table 3.

TABLE 3

Print Shop One

| Cell | Station | Fixed Cost |
| --- | --- | --- |
| Cell One | Printer A | 2448874 |
| Cell One | Inserter A | 423366 |
| Cell One | Inserter B | 143304 |
| Cell One | Printer B | 2448874 |
| Cell Two | Printer C | 3000000 |
| Cell Two | Inserter B | 1443304 |

The number of stations in a cell may be varied between 1 and 3, which results in 729 ($3^6$) configurations. The brute force approach visits all configurations and identifies the least cost configuration with a job turnaround-time metric less than or equal to 5 hours.

The greedy approach initially starts with a solution having the maximum number of equipment of each type in each cell (e.g., three production devices) and by following the approach described above, converges to the optimal solution. Table 4 illustrates the optimal configuration and computation time using the brute force approach as compared to the greedy approach according to an embodiment.

TABLE 4

| | Brute Force Approach | Greedy Algorithm | | |
| --- | --- | --- | --- | --- |
| | Optimal Solution | Run 1 | Run 2 | Run 3 |
| No. of Printer A in Cell One | 1 | 1 | 1 | 1 |
| No. of Inserter A in Cell One | 1 | 1 | 1 | 1 |
| No. of Inserter B in Cell One | 3 | 3 | 3 | 3 |
| No. of Printer B in Cell One | 1 | 1 | 1 | 1 |
| No. of Printer C in Cell Two | 1 | 1 | 1 | 1 |
| No. of Inserter B in Cell Two | 2 | 2 | 2 | 2 |
| Total Station Cost ($) | 15568553 | 15567043 | 15567083 | 15567045 |
| Number of Simulations | 21870 | 72 | 72 | 72 |
| Tim in Hours or Minutes | 29.94 hours | 8.48 mins | 8.6 mins | 8.73 mins |

The following example illustrates the described approach of determining a cell configuration (referred to as a greedy approach) compared with a brute force approach according to an embodiment. This example assumes two cells and eleven production devices as illustrated in Table 5.

TABLE 5

Print Shop Two

| Cell | Station | Fixed Cost |
| --- | --- | --- |
| Cell One | BW Printer 1 | 50000 |
| Cell One | Tab | 32000 |
| Cell One | Punch | 30000 |
| Cell One | Tape Bind | 35000 |
| Cell One | Staple | 40000 |
| Cell Two | Laminate | 53000 |
| Cell Two | Wire Punch | 40000 |
| Cell Two | Color Printer | 75000 |
| Cell Two | BW Printer | 250000 |
| Cell Two | Poster Print | 55000 |
| Cell Two | Wire Bind | 38000 |

The number of stations in a cell may be varied between 1 and 2, which results in 2,048 ($2^{11}$) configurations. The brute force approach visits all configurations and identifies the least cost configuration with a job turnaround-time metric less than or equal to 4 hours.

The greedy approach initially starts with a solution having the maximum number of equipment of each type in each cell (e.g., two production devices) and by following the approach described above, converges to the optimal solution. Table 6 illustrates the optimal configuration and computation time using the brute force approach as compared to the greedy approach according to an embodiment.

TABLE 6

| | Brute Force Approach | Greedy Algorithm | | |
| --- | --- | --- | --- | --- |
| | Optimal Solution | Run 1 | Run 2 | Run 3 |
| No. of BW Printer 1 in Cell One | 2 | 2 | 2 | 2 |
| No. of Tab in Cell One | 1 | 1 | 1 | 1 |
| No. of Punch in Cell One | 1 | 1 | 1 | 1 |
| No. of Tape Bind in Cell One | 1 | 1 | 1 | 1 |
| No. of Staple in Cell One | 1 | 1 | 1 | 1 |
| No. of Laminate in Cell Two | 1 | 1 | 1 | 1 |
| No. of Wire Punch in Cell Two | 1 | 1 | 1 | 1 |
| No. of Color Printer in Cell Two | 2 | 2 | 2 | 2 |
| No. of BW Printer 2 in Cell Two | 1 | 1 | 1 | 1 |
| No. of Poster Print in Cell Two | 1 | 1 | 1 | 1 |
| No. of Wire Bind in Cell Two | 1 | 1 | 1 | 1 |

TABLE 6-continued

|  | Brute Force Approach | Greedy Algorithm | | |
| --- | --- | --- | --- | --- |
|  | Optimal Solution | Run 1 | Run 2 | Run 3 |
| Total Station Cost | 623,000 | 623,000 | 623,000 | 623,000 |
| Number of Simulations | 20,480 | 76 | 76 | 76 |
| Time in Hours or Minutes | 17.06 hours | 3.2 mins | 3.36 mins | 3.35 mins |

The described methods and systems identify a cell configuration in a production environment that reduces cost while still satisfying one or more performance metrics. In an embodiment, the process of identifying a cell configuration may initially starts with a sufficient number of devices in one or more cells, and removes one or more production devices from one or more cells without violating performance criteria. This process is repeated until no further cost reduction is possible. The device that is chosen to be removed at each iteration may be the production device with the best, in a heuristic rule sense, cost-to-benefit tradeoff.

In another embodiment, the process of identifying a cell configuration may start with an insufficient number of devices in one or more cells, and may add one or more production devices to satisfy performance criteria. This process is repeated until no further cost reduction is possible. The device that is chosen to be added at each iteration may be the production device with the best, in a heuristic rule sense, cost-to-benefit tradeoff.

Figure 6:
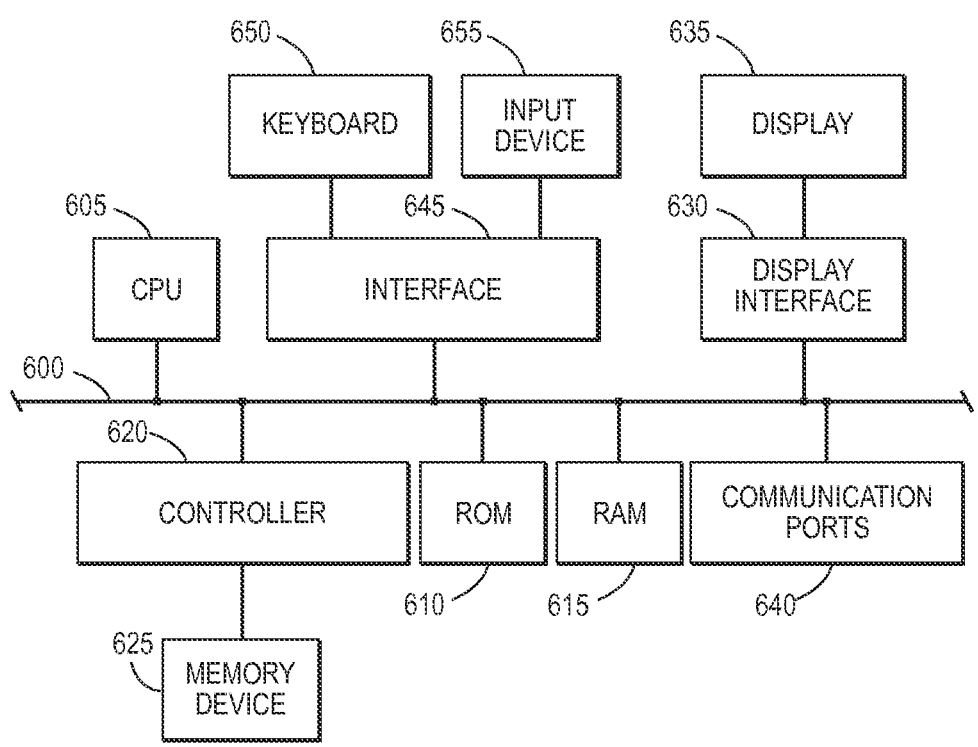
FIG. 6 illustrates a block diagram of example hardware that may be used to contain or implement program instructions according to an embodiment.

FIG. 6 depicts a block diagram of hardware that may be used to contain or implement program instructions. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an example of a production device, computing device or processor as such terms are used within this disclosure. Read only memory (ROM) 610 and random access memory (RAM) 615 constitute examples of non-transitory computer-readable storage media.

A controller 620 interfaces with one or more optional non-transitory computer-readable storage media 625 to the system bus 600. These storage media 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible non-transitory computer-readable medium such as a compact disk, a digital disk, flash memory, a memory card, a USB drive, an optical disc storage medium, such as a Blu-ray™ disc, and/or other recording medium.

An optional display interface 630 may permit information from the bus 600 to be displayed on the display 635 in audio, visual, graphic or alphanumeric format. Communication with external devices, such as a printing device, may occur using various communication ports 640. A communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of determining a cell configuration in a print production environment, the method comprising:
    identifying a set comprising a plurality of print production devices, wherein each print production device is available to be used in a cell of a print production environment;
    running a first simulation using the plurality of print production devices to determine:
        a first primary performance metric value associated with assigning the plurality of print production devices to the cell, and
        a first secondary performance metric value associated with assigning the plurality of print production devices to the cell;
    determining whether the first primary performance metric value satisfies a first constraint and the first secondary performance metric value satisfies a second constraint; and
    in response to determining that the first primary performance metric value and the first secondary performance metric value satisfy the one or more constraints:
        identifying one or more subsets, wherein each subset comprises a unique portion of the plurality of print production devices, wherein each portion comprises a number of print production devices that is less than a number of print production devices in the plurality of print production devices,
        for each subset, running a second simulation using the print devices associated with the subset to determine:
            a second primary performance metric value associated with assigning the print devices associated with the subset to the cell, and
            a second secondary performance metric value associated with assigning the print devices associated with the subset to the cell,
        selecting one of the subsets based on one or more of the associated second primary performance metric value and the second secondary performance metric value,
        determining one or more removed print production devices, wherein each removed production device is included in the set but not the selected subset, and removing the removed print production devices from the set to create a modified set.

2. The method of claim 1, further comprising:
identifying one or more new subsets, wherein each new subset comprises a unique portion of the plurality of print production devices in the modified set, wherein each portion comprises a number of print production devices that is less than a number of print production devices in the modified set;
for each new subset, running a third simulation using the print devices associated with the subset to determine:
a third primary performance metric value associated with assigning the print devices associated with the new subset to the cell, and
a third secondary performance metric value associated with assigning the print devices associated with the new subset to the cell,
selecting one of the new subsets based on one or more of the associated third primary performance metric value and the third secondary performance metric value, wherein the third primary performance metric value satisfies the first constraint and the third secondary performance metric value satisfies the second constraint;
determining one or more updated removed print production devices, wherein each updated removed production device is included in the selected subset but not the selected new subset; and
removing the updated removed print production devices from the subset to create an updated modified set.

3. The method of claim 1, wherein selecting one of the subsets comprises:
identifying a production device whose removal results in a largest reduction of the primary performance metric without violating a constraint associated with the secondary performance metric; and
selecting the subset that does not include the identified production device.

4. The method of claim 1, wherein selecting one of the subsets comprises:
identifying a production device whose removal results in a smallest decrease in the secondary performance metric; and
selecting the subset that does not include the identified production device.

5. The method of claim 1, wherein:
the first primary performance metric value represents a cost associated with assigning the plurality of print production devices to the cell,
the first secondary performance metric value represents a turnaround time with assigning the plurality of print production devices to the cell,
the first constraint represents a maximum cost value, and the second constraint represents a maximum turnaround time value.

6. A method of determining a cell configuration in a print production environment, wherein the method comprises:
identifying a set of print devices to assign to a cell;
identifying a print device number;
identifying one or more subsets of print devices from the set, wherein each subset comprises a unique portion of the print devices in the set, wherein each subset comprises a number of print devices equal to the print device number;
performing a simulation of operation on each subset to determiner a subset performance metric for each subset;
selecting one of the subsets based on the associated subset performance metric;

decrementing the print device number by an amount;
updating the set with the selected subset; and
repeating the identifying one or more subsets, performing the simulation, selecting one of the subsets, decrementing the print device number and updating until no subset performance metric satisfies a performance constraint.

7. The method of claim 6, wherein selecting one of the subsets comprises:
identifying a production device whose removal results in a largest reduction of the subset performance metric; and
selecting the subset that does not include the identified production device.

8. The method of claim 6, wherein selecting one of the subsets comprises:
identifying a production device whose removal results in a smallest decrease in the subset metric; and
selecting the subset that does not include the identified production device.

9. The method of claim 6, wherein the subset performance metric is average turnaround time, average cost, or both, for print jobs processed by the cell.

10. A system of determining a cell configuration in a print production environment, the system comprising:
a computing device; and
a non-transitory computer-readable storage medium in communication with the computing device, wherein the non-transitory computer-readable storage medium comprises one or more programming instructions that, when executed, cause the computing device to:
identify a set comprising a plurality of print production devices, wherein each print production device is available to be used in a cell of a print production environment,
run a first simulation using the plurality of print production devices to determine:
a first primary performance metric value associated with assigning the plurality of print production devices to the cell, and
a first secondary performance metric value associated with assigning the plurality of print production devices to the cell,
determine whether the first primary performance metric value satisfies a first constraint and the first secondary performance metric value satisfies a second constraint, and
in response to determining that the first primary performance metric value and the first secondary performance metric value satisfy the one or more constraints:
identify one or more subsets, wherein each subset comprises a unique portion of the plurality of print production devices, wherein each portion comprises a number of print production devices that is less than a number of print production devices in the plurality of print production devices,
for each subset, run a second simulation using the print devices associated with the subset to determine:
a second primary performance metric value associated with assigning the print devices associated with the subset to the cell, and
a second secondary performance metric value associated with assigning the print devices associated with the subset to the cell,
select one of the subsets based on one or more of the associated second primary performance metric value and the second secondary performance metric value, determine one or more removed print production devices, wherein each removed production device is included in the set but not the selected subset, and remove the removed print production devices from the set to create a modified set.

11. The system of claim 10, wherein the non-transitory computer-readable storage medium further comprises one or more programming instructions that, when executed, cause the computing device to:

identify one or more new subsets, wherein each new subset comprises a unique portion of the plurality of print production devices in the modified set, wherein each portion comprises a number of print production devices that is less than a number of print production devices in the modified set;

for each new subset, run a third simulation using the print devices associated with the subset to determine:

a third primary performance metric value associated with assigning the print devices associated with the new subset to the cell, and a third secondary performance metric value associated with assigning the print devices associated with the new subset to the cell, select one of the new subsets based on one or more of the associated third primary performance metric value and the third secondary performance metric value, wherein the third primary performance metric value satisfies the first constraint and the third secondary performance metric value satisfies the second constraint;

determine one or more updated removed print production devices, wherein each updated removed production device is included in the selected subset but not the selected new subset; and remove the updated removed print production devices from the subset to create an updated modified set.

12. The system of claim 10, wherein the one or more programming instructions that, when executed, cause the computing device to select one of the subsets comprise one or more programming instructions that, when executed, cause the computing device to:

identify a production device whose removal results in a largest reduction of the primary performance metric without violating a constraint associated with the secondary performance metric; and select the subset that does not include the identified production device.

13. The system of claim 10, wherein the one or more programming instructions that, when executed, cause the computing device to select one of the subsets comprise one or more programming instructions that, when executed, cause the computing device to:

identify a production device whose removal results in a smallest decrease in the secondary performance metric; and select the subset that does not include the identified production device.

14. The system of claim 10, wherein:

the first primary performance metric value represents a cost associated with assigning the plurality of print production devices to the cell, the first secondary performance metric value represents a turnaround time with assigning the plurality of print production devices to the cell, the first constraint represents a maximum cost value, and the second constraint represents a maximum turnaround time value.

15. A system of determining a cell configuration in a print production environment, wherein the system comprises:

a computing device; and a non-transitory computer-readable storage medium in communication with the computing device, wherein the non-transitory computer-readable storage medium comprises one or more programming instructions that, when executed, cause the computing device to:

identify a set of print devices to assign to a cell, identify a print device number, identify one or more subsets of print devices from the set, wherein each subset comprises a unique portion of the print devices in the set, wherein each subset comprises a number of print devices equal to the print device number, perform a simulation of operation on each subset to determiner a subset performance metric for each subset, select one of the subsets based on the associated subset performance metric, decrement the print device number by an amount, update the set with the selected subset, and repeating the identify one or more subsets, perform the simulation, select one of the subsets, decrement the print device number and update until no subset performance metric satisfies a performance constraint.

16. The system of claim 15, wherein the one or more programming instructions that, when executed, cause the computing device to select one of the subsets comprise one or more programming instructions that, when executed, cause the computing device to:

identify a production device whose removal results in a largest reduction of the subset performance metric; and select the subset that does not include the identified production device.

17. The system of claim 15, wherein the one or more programming instructions that, when executed, cause the computing device to select one of the subsets comprise one or more programming instructions that, when executed, cause the computing device to:

identify a production device whose removal results in a smallest decrease in the subset metric; and select the subset that does not include the identified production device.

18. The system of claim 15, wherein the subset performance metric is average turnaround time, average cost, or both, for print jobs processed by the cell.

* * * * *